(12) United States Patent
Leguede et al.

(10) Patent No.: US 7,150,441 B2
(45) Date of Patent: Dec. 19, 2006

(54) RUNNER FOR A MOTOR VEHICLE SEAT

(75) Inventors: Arnault Leguede, Conde sur Noireau (FR); Farid Senahdji, Flers (FR)

(73) Assignee: Faurecia Sieges D'Automobile, Nanterre (FR)

( * ) Notice: Subject to any disclaimer, the term of this patent is extended or adjusted under 35 U.S.C. 154(b) by 158 days.

(21) Appl. No.: 10/811,588

(22) Filed: Mar. 29, 2004

(65) Prior Publication Data

US 2004/0217251 A1  Nov. 4, 2004

(30) Foreign Application Priority Data

Apr. 8, 2003  (FR) .................................. 03 04341

(51) Int. Cl.
*F16M 13/00* (2006.01)
(52) U.S. Cl. ........................ 248/423; 248/430; 297/340
(58) Field of Classification Search ................ 248/423, 248/424, 429, 430
See application file for complete search history.

(56) References Cited

U.S. PATENT DOCUMENTS

| | | | |
|---|---|---|---|
| 4,730,804 A * | 3/1988 | Higuchi et al. | 248/429 |
| 5,707,035 A * | 1/1998 | Kargol et al. | 248/429 |
| 5,806,825 A | 9/1998 | Couasnon | 248/429 |
| 6,010,190 A * | 1/2000 | Downey | 297/340 |
| 6,036,157 A | 3/2000 | Baroin et al. | 248/429 |
| 6,098,946 A * | 8/2000 | Sechet et al. | 248/424 |
| 6,113,051 A | 9/2000 | Moradell et al. | 248/430 |
| 6,227,596 B1 | 5/2001 | Foucault et al. | 296/65.13 |
| 6,354,553 B1 * | 3/2002 | Lagerweij et al. | 248/430 |
| 6,698,835 B1 * | 3/2004 | Kojima et al. | 297/344.1 |
| 6,902,235 B1 * | 6/2005 | Rohee et al. | 297/334 |
| 2001/0015401 A1 * | 8/2001 | Yoshida et al. | 248/430 |

FOREIGN PATENT DOCUMENTS

| | | | | |
|---|---|---|---|---|
| FR | 2 736 311 | 1/1997 | | 2/8 |
| FR | 2 829 974 | 3/2003 | | 2/8 |

OTHER PUBLICATIONS

Preliminary Int'l. Search Report dated Dec. 4, 2003; Appl. No. FR 0304341.

* cited by examiner

*Primary Examiner*—Anita M. King
(74) *Attorney, Agent, or Firm*—McCracken & Frank LLP (57) ABSTRACT

A runner for a motor vehicle seat comprises a fixed rail, a moving rail, a latch and an actuating element. A retaining device for retaining the actuating element is adapted to co-operate with a longitudinal indexing system on the fixed rail. The retaining device firstly holds the actuating element in an unlocking position over at least one predetermined range of longitudinal positions Further, the retaining device secondly allows the actuating element to move into a locking position outside the at least one predetermined range of longitudinal positions.

9 Claims, 9 Drawing Sheets

RUNNER FOR A MOTOR VEHICLE SEAT

FIELD OF THE INVENTION

The present invention relates to runners for a motor vehicle seat. A set of two parallel runners are generally provided for each seat.

More particularly, the invention relates to such a runner which comprises:

a fixed rail and a moving rail mounted to move relative to the fixed rail along a longitudinal axis;

a latch received between the fixed rail and the moving rail and which is mounted to move between a locked position in which said latch holds the moving rail stationary, and an unlocked position in which said latch enables the moving rail to move, and resilient drive means for resiliently driving the latch towards its locked position; and an actuating element mounted to move relative to the moving rail between an unlocking position in which said actuating element brings the latch into its unlocked position and an unlocking position in which said latch can be moved towards its unlocked position under the drive from the resilient drive means.

BACKGROUND OF THE INVENTION

In this type of runner, the latch is generally provided with a plurality of teeth which serve, when the latch is in its locked position, to come to co-operate with series of cutouts formed in the moving rail, and with series of catches formed on the fixed rail so as to hold said moving rail to prevent it from moving relative to the fixed rail. Conventionally, the catches formed on the fixed rail are spaced apart uniformly at an identical pitch, thereby making it possible for the teeth on the latch to lock between the catches at uniform intervals, so as to enable the moving rail to be adjusted in as many longitudinal positions as there are catches on the fixed rail.

However, with certain types of motor vehicle seat, such as, for example rear bench seats, it is preferable for the moving rail to be locked relative to the fixed rail in predetermined longitudinal positions of which there can be three, for example, which requires the latch to be in the locked position in its predetermined longitudinal positions only. For this purpose, and in a manner known per Se, the fixed rails of such runners have catches that are not uniformly spaced apart so as to generate zones without catches and zones with catches, said zones with catches serving to co-operate with the teeth on the latch to define predetermined locking positions in which the moving rail is locked relative to the fixed rail.

It can thus be understood that, in order to obtain predetermined locking positions in which the moving rail is locked relative to the fixed rail, it is essential to configure the series of catches on the fixed rail to obtain zones without catches that form zones in which the latch cannot return to its locked position. This thus makes it necessary to manufacture specific sets of runners having catches that are non-uniformly distributed when it is desired for the moving rail to lock in a small number of predetermined longitudinal positions only.

OBJECTS AND SUMMARY OF THE INVENTION

A particular object of the present invention is to mitigate the above-mentioned drawbacks by using a standard runner having catches that are uniformly distributed, and by adding elements that can be easily adapted to the standard runner in order to enable the moving rail to be locked relative to the fixed rail in a small number of predetermined longitudinal positions only, the number of positions being small relative to the number of catches in the runner.

To this end, according to the invention, in a runner of the type in question, retaining means for retaining the actuating element are adapted to co-operate with longitudinal indexing means on the fixed rail so as firstly to hold the actuating element in its unlocking position over at least one predetermined range of longitudinal positions, and secondly to allow said actuating element to move into its locking position outside said at least one predetermined range of longitudinal positions.

By means of these provisions, it is possible to adapt a runner that is initially organized to enable a moving runner to be adjusted in a plurality of longitudinal positions to form a runner that allows the moving rail to be locked relative to the fixed rail in a small number of predetermined longitudinal positions only.

In preferred embodiments of the invention, it is optionally possible to use one or more of the following provisions:

the actuating element is mounted directly to pivot on an arm about a first transverse axis that is perpendicular to the longitudinal axis, said arm being mounted in fixed manner on the moving rail;

the retaining means for retaining the actuating element comprise a peg and the longitudinal indexing means on the fixed rail comprise a longitudinal guide ramp which has firstly at least one unlocking segment forming the predetermined range within which the peg is in abutting contact against the unlocking segment for holding the actuating element in its unlocking position, and secondly at least two recesses disposed on either side of the unlocking segment and which are designed to receive the peg on the retaining means of the actuating element so as to allow said actuating element to move towards its locking position after the catch has moved towards its locked position under the drive from the resilient drive means;

the peg is formed integrally with the actuating element, and the longitudinal guide ramp is in the form of a substantially horizontal rigid plate that is mounted in fixed manner on the fixed rail;

the retaining means comprise a lever mounted to pivot on the arm of the moving rail, the lever having said peg and a projecting member serving to hold the actuating element in its unlocking position when the peg of the lever is in abutting contact with the unlocking segment of the guide ramp;

the unlocking segment and the two recesses are provided in a substantially vertical plate mounted in fixed manner on a side wall of the fixed rail, and the lever is mounted to pivot about the first transverse axis;

the unlocking segment and the two recesses are formed by a substantially longitudinal groove provided in a side flange of the fixed rail, said peg being received in the groove and the lever being mounted to pivot on the arm about a second transverse axis parallel to the first transverse axis;

the peg is disposed on a lever mounted on the actuating element so that said lever is constrained to move with the actuating element and the longitudinal guide ramp is in the form of a rigid plate mounted in fixed manner on the fixed rail;

the retaining means for retaining the actuating element comprise a lever which is mounted to pivot on said actuating element about a second transverse axis that is parallel to the first transverse axis, said lever having a peg and a cam surface serving to come into abutting contact, when the peg does not co-operate with the indexing means, against a substantially horizontal abutment plate which is secured to the arm of the moving rail under the drive from a traction spring which connects said lever to the actuating element so as to hold the actuating element in its unlocking position; and the longitudinal indexing means on the fixed rail are formed by projecting members disposed in fixed manner on a side wall of the fixed rail, each projecting member having a substantially triangular shape with two slopes which converge towards a top vertex, said peg of the lever serving to come into contact against one of the slopes of one of the projecting members while the moving rail is moving, so as to enable the lever to pivot and so as to enable its cam surface to be disengaged from the abutment plate, thereby enabling the actuating element to move towards its locking position under the drive from the resilient drive means which drive the latch towards its locked position.

BRIEF DESCRIPTION OF THE DRAWINGS

Other characteristics and advantages of the invention appear from the following description of embodiments thereof, given by way of non-limiting example, and with reference to the accompanying drawings.

In the drawings.

MORE DETAILED DESCRIPTION

In the various figures, like references designate elements that are identical or similar.

Figure 1:
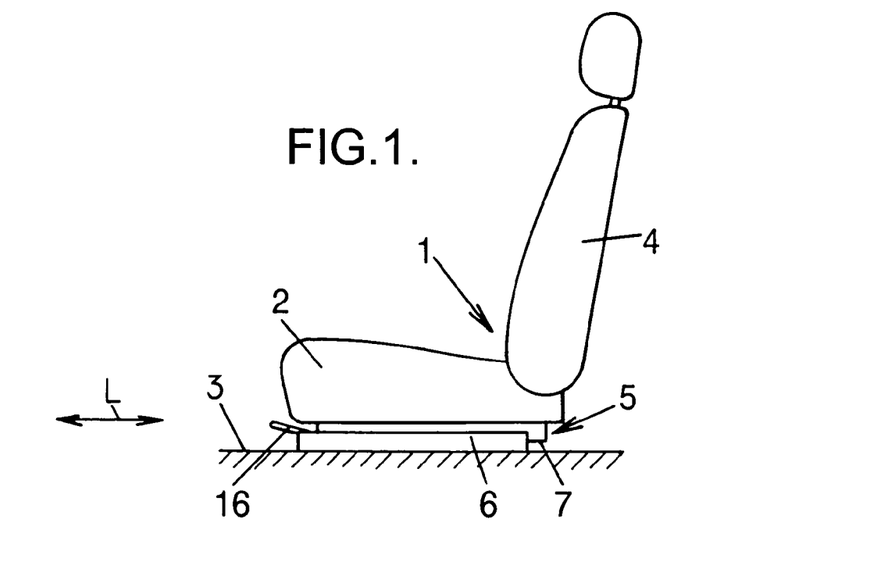
FIG. 1 is a side elevation view of a seat provided with runners of the invention.

FIG. 1 shows a motor vehicle seat 1 which comprises a seat proper 2 mounted on a vehicle floor 3, and a seat back 4 mounted on the seat proper 2.

The floor 3 of the vehicle is connected to the seat proper 2 via two runners 5 (only one of which is shown in FIG. 1) making it possible to adjust the position of the seat 1 on the floor 3 of the vehicle by sliding along a longitudinal axis L.

Figure 2:
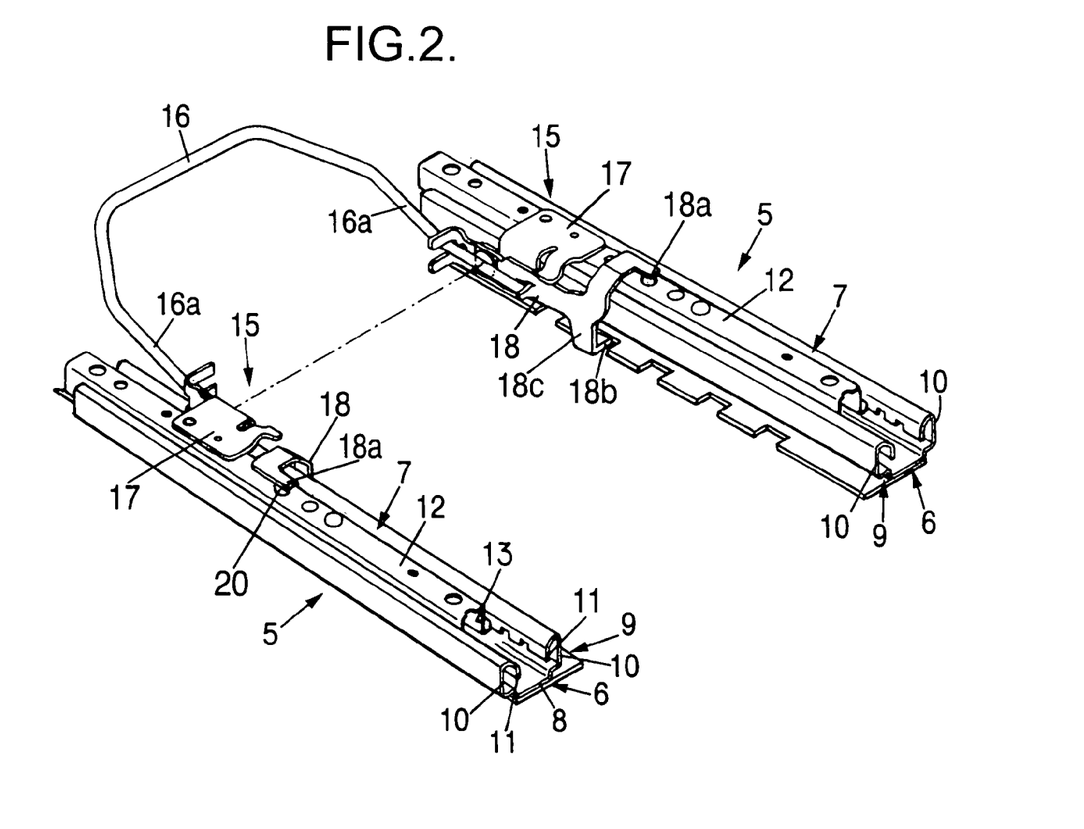
FIG. 2 is a perspective view of runners that can equip the seat of FIG. 1.

Each of the two runners 5 shown in FIG. 2 comprises a fixed rail 6 that is fixed directly to the floor 3 of the vehicle, and a moving rail 7 mounted to slide inside the fixed rail 6. The moving rail 7 is designed to be fixed by any suitable means to the bottom face of the seat proper 2.

Figure 3:
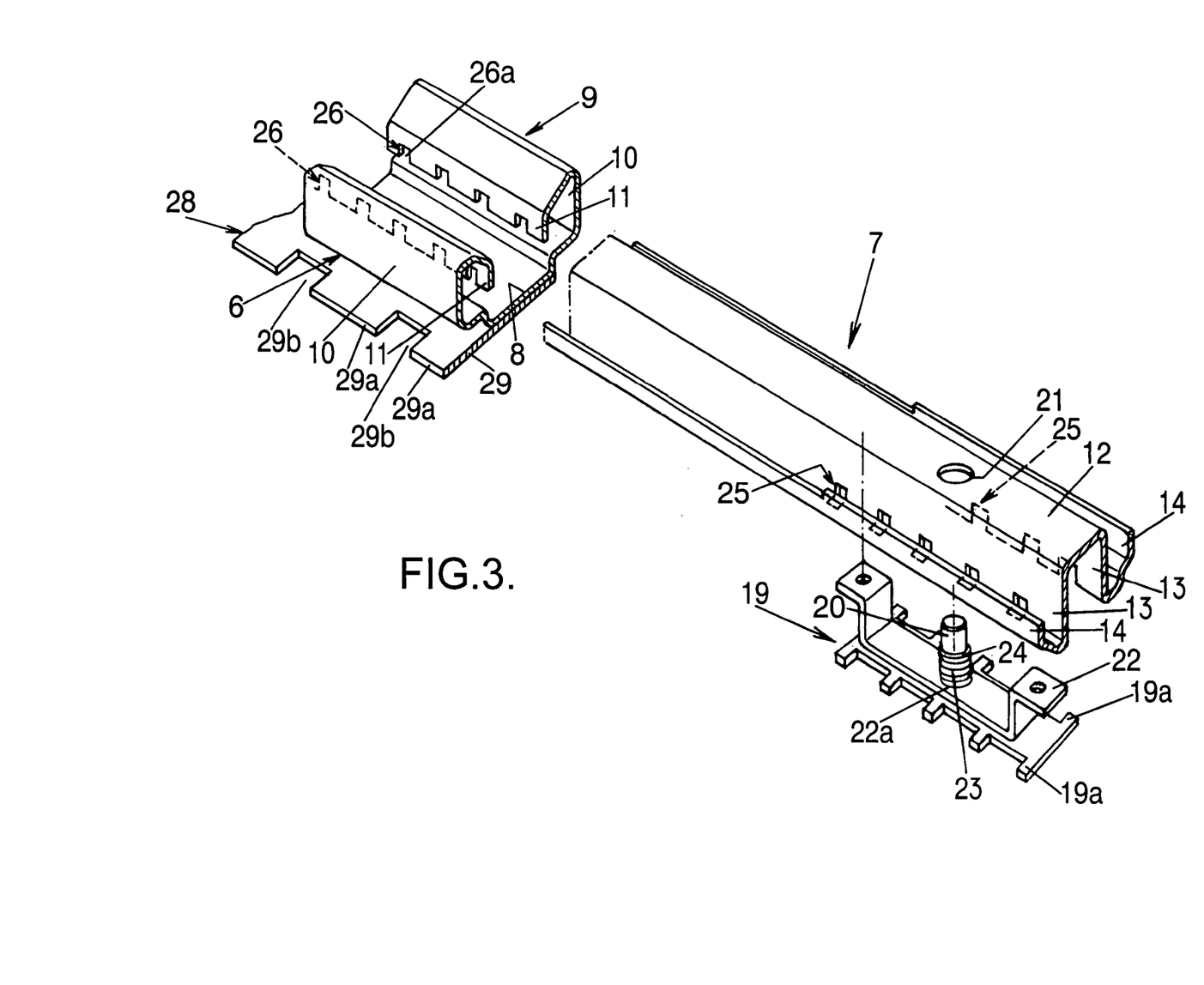
FIG. 3 is a perspective view of a locking mechanism for locking one of the runners of FIG. 2, showing, in particular, the latch internal to the runner.

As can be seen in more detail in FIGS. 2 and 3, in the example considered herein, the fixed rail 6 is substantially channel-section, with its cross-section comprising a bottom horizontal web 8 from which two side walls 9 extend, each of which is formed by a substantially vertical flange 10, and is extended by a folded-over flange extension 11. Each flange extension 11 of the side walls 9 of the fixed rail 6 extends towards the inside of the channel section and towards the web 8 of said fixed rail 6.

The moving rail 7 is substantially upside-down channel-section, with its cross-section comprising a top horizontal web 12 from which two vertical flanges 13 extend downwards. The two vertical flanges 13 of the moving rail 7 are extended by folded-over lips 14 extending upwards and towards the outside of the channel section. When the moving rail 7 is assembled to the fixed rail 6 to form the runner 5, the lips 14 of the moving profile 7 are received between the vertical flanges 10 and the flange extensions 11 of the fixed rail 6, while the flange extensions 11 on the fixed rail are received between the vertical flanges 13 and the lips 14 on the moving rail 7.

The side walls 9 of the fixed rail 6 and the lips 14 of the moving rail 7 define recesses shaped so as to form raceways for balls (not shown in the Figures) in order to make it easier for the moving rail 7 to move longitudinally along the fixed rail 6.

As can be seen in FIG. 2, each rail 5 is also provided with locking and unlocking means 15 for locking and unlocking the moving rail 7 relative to the fixed rail 6. The locking and unlocking means 15 are controlled by a control member 16 such as a control bar or the like in the form of an arcuate bar whose two side branches 16a are connected to the locking means 15 of respective ones of the two runners 5. The control bar 16 also has a middle branch situated substantially under the front end of the seat proper 2 so as to be actuated by a user of the seat 1.

As can be seen in FIG. 2, each of the locking and unlocking means 15 comprises an arm 17 mounted in fixed manner on the top web 12 of the moving rail 7 which is associated with said arm, e.g. by riveting or welding, and an actuating element or lever 18 mounted to pivot on the arm 17 about a first transverse axis Y1. The two side branches 16a of the control bar 16 are connected to the two actuating element 18 in order to enable them to pivot about the first transverse axis Y1 by actuating the middle branch of the control bar 16.

Each actuating element 18 for actuating the locking and unlocking means 15 has a control finger 18a which serves, while the actuating element 18 is pivoting about the first transverse axis Y1, to move a latch 19 for enabling the moving rail 7 to be locked or unlocked relative to the fixed rail 6.

In the example shown in FIG. 3, the latch 19 is formed by a steel plate secured to the bottom end of a control rod 20 which also has a top end serving to pass through an opening 21 provided in the top flat web 12 of each moving rail 7 for the purpose of co-operating with the control finger 18a that is associated with it. The control rod 20 is mounted to slide vertically inside a through opening 22a in a metal guide 22 which is itself mounted in fixed manner on the flat web 12 of the moving rail 7.

The metal guide 22 supports resilient return means 23 such as a helical spring surrounding the control rod 20 and urging the latch 19 towards a high position in which said latch 19 is close to the metal guide 22. For this purpose, the spring 23 can be interposed between the metal guide 22 and a collar 24 formed on the control rod 20.

As can be seen in FIG. 3, the latch 19 is in the form of a horizontal flat plate which extends substantially parallel to the webs 8 and 12 of the fixed rail 6 and of the moving rail 7. On each of its side edges, the latch 19 is provided with a series of teeth 19a.

When the runner is in the assembled state, the series of teeth 19a of the latch 19 extend transversely beyond the vertical flanges 13 of the moving rail 7, by passing through cutouts 25 of complementary shape provided in the bottom portions of the two vertical flanges 13 of the moving rail 7. In addition, when they pass through the cutouts 25, the series of teeth 19a of the latch 19 engage into respective series of notches 26a defined by catches 26 provided on the ends of the flange extensions 11 of the fixed rail 6. The catches 26 provided on the end portions of the flange extensions 11 are uniformly distributed along the longitudinal axis L, thereby forming a series of catches at a constant pitch.

With a runner as described above, when a user actuates the middle portion of the control bar 16 by pulling it upwards, said user moves the actuating element into an unlocking position in which the control finger 18a of said actuating element presses on the top end of the control rod 20 so as to move the latch 19 vertically into an unlocked position. In this unlocked position which corresponds to the latch 19 being in the low position, the series of teeth 19a do not co-operate with the series of catches 26 on the fixed rail 6, thereby making it possible for the moving rail 7 to be moved longitudinally relative to said fixed rail 6.

Conversely, when the user releases the control bar 16, the spring 23 then automatically returns the latch 19 that is associated with it into a locked position. In the locked position, which corresponds to the latch 19 being in the high position, the series of teeth 19a engage in the series of catches 26, while passing through the cutouts 25 in the moving rail 7, thereby making it possible for the moving rail 7 to be prevented from moving longitudinally relative to the fixed rail 6. The latch 19 being returned into its locked position under the drive from the resilient drive means formed by the spring 23 also makes it possible to return the actuating element 18 to a locking position.

In the invention, and in a first embodiment shown in FIGS. 2, 3, 4a, and 4b, each runner 5 is also provided with retaining means 27 for retaining the actuating element 18, said retaining means 27 being adapted to cooperate with longitudinal indexing means 28 on the fixed rail 6 for making it possible, firstly, to hold the actuating element 18 in its unlocking position over at least one predetermined range of longitudinal positions, and secondly to move the actuating element 18 towards its locking position outside the predetermined range of longitudinal positions.

Figure 4A:
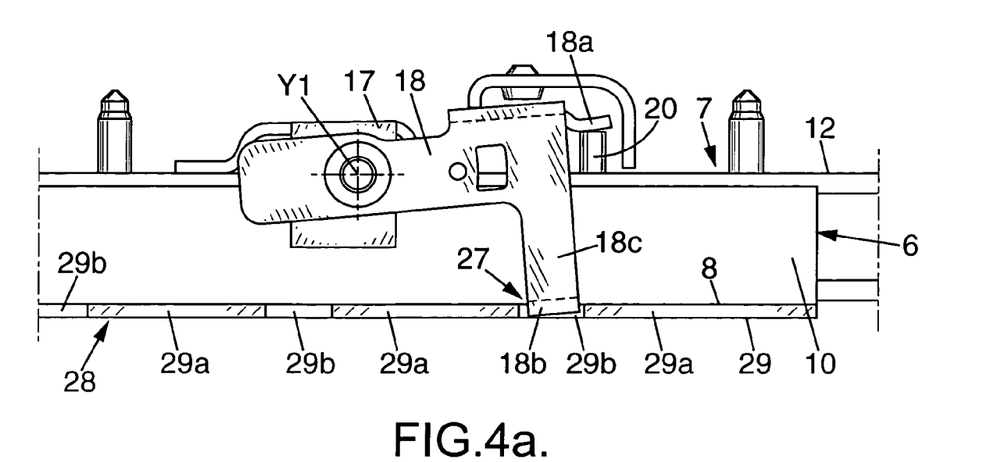
FIGS. 4a and 4b are side views of a first embodiment of the runner, showing the actuating element respectively in the locking position and in the unlocking position.
Figure 4B:
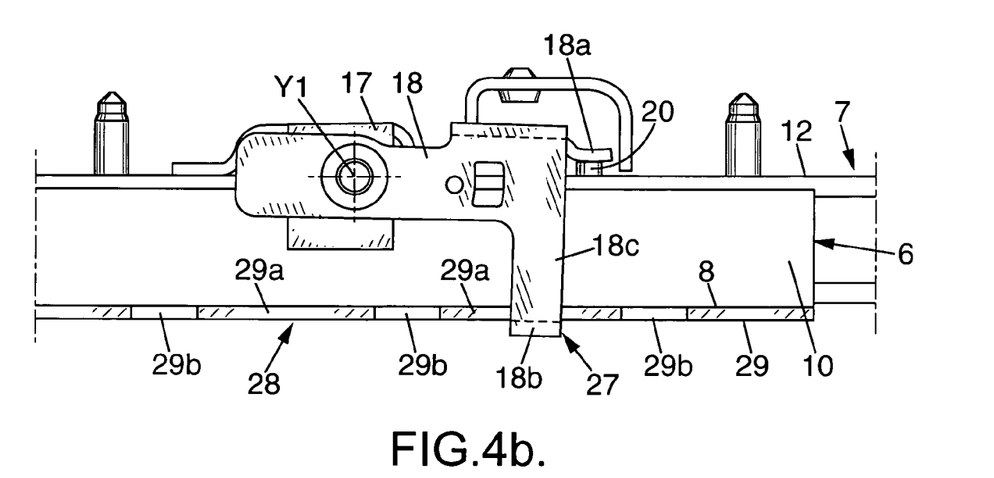

More precisely, and as can be seen in FIGS. 4a and 4b, the retaining means 27 for retaining the actuating element 18 are, in this example, formed by a peg 18b which is formed integrally with a vertical branch 18c of the actuating element 18. The peg 18b extends substantially perpendicularly to the vertical branch 18c, towards the fixed rail 6.

In the first embodiment, the indexing means 28 are formed by a rigid plate 29 that is substantially horizontal and that is mounted in fixed manner on the bottom flat web 8 of each fixed rail 6. More exactly, the rigid plate forms a longitudinal guide ramp which includes at least one unlocking segment 29a defined longitudinally by two recesses 29b. As shown in FIG. 4a, when the actuating element 18 is in the locking position which also corresponds to the latch 19 being in the locked position, the peg 18b of the actuating element 18 passes through or is received in part in a recess 29b so that the peg 18b of the actuating element does not co-operate with the guide ramp formed by the rigid plate 29. When the user actuates the control rod 16 to cause the actuating element 18 to pivot towards its unlocking position which corresponds to the latch 19 being in the unlocked position, the peg 18b of the actuating element 18 then comes to be placed substantially under the plate 29. The user can then move the seat forwards or backwards along the longitudinal axis L so that the peg 18b of the actuating element 18 comes to be positioned under one of the unlocking segments 29a of the plate 29. The user can then release the control bar 16, thereby causing the peg 18b of the actuating element 18 to come into abutting contact against one of the locking segments 29a so that the resilient drive means formed by the spring 23 cannot return the latch 19 to its locked position (FIG. 4b). Since the moving rail 7 is not prevented from moving relative to the fixed rail 6, the user can then continue to move the seat along the longitudinal axis until the peg 18b comes into register with one of the recesses 29b in the guide ramp formed by the plate 29. In this configuration, the spring 23 urges the latch 19 into its locked position while the top end of the control rod 20 brings the actuating element 18 back into its locking position.

The length of each unlocking segment 29a may differ from one segment to another, and each segment represents a determined range of longitudinal positions in which the moving rail 7 cannot be prevented from moving relative to the fixed rail 6 even though the latch or more particularly its teeth 19a go a plurality of times past a plurality of catches 26 on the fixed rail 6.

Figure 5:
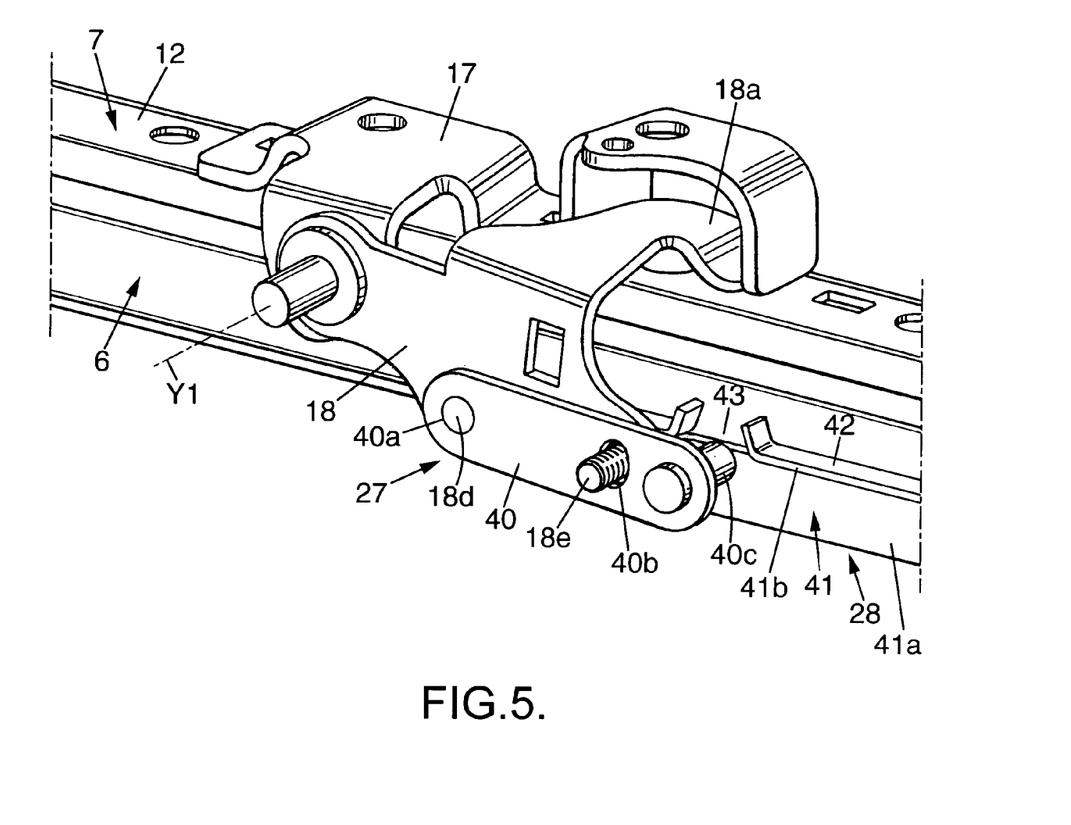
FIG. 5 is a perspective view of a second embodiment of the runner.

In a second embodiment of the invention shown in FIG. 5, the retaining means 27 for retaining the actuating element 18 are, in this example, formed by a lever 40 mounted in fixed manner on the actuating element 18. For this purpose, the lever 40 is provided with a first through opening 40a which receives a projecting member 18d that projects from the actuating element 18, and with a second through opening 40b through which a threaded rod 18e secured to the actuating element 18 passes. The threaded rod 18e of the actuating element 18 that passes through the lever 40 serves to co-operate with a nut (not shown) so as to fix the lever 40 to the actuating element 18 and so as to constrain said lever to move with said actuating element. As can also be seen in FIG. 5, the lever 40 is provided with a peg 40c which serves to co-operate with longitudinal indexing means 28 mounted on the fixed rail 6.

In the second embodiment, the indexing means 28 are formed by a plate 41 having a cross-section that is substantially S-shaped and comprising a substantially horizontal bottom flange (not shown) mounted directly in fixed manner on the web 8 of each fixed rail 6, a substantially vertical flange 41a and a horizontal flange 41b serving to form the guide ramp co-operating with the peg 40c on the lever 40 that is mounted on the actuating element 18. For this purpose, the horizontal flange 41b of the plate 41 is made up of uninterrupted portions 42 forming unlocking segments separated by openings 43 forming recesses through which the peg 40c of the lever 40 is designed to pass so as to enable the actuating element 18 to return to its locking position.

FIG. 5 shows the actuating element 18 in its unlocking position so that the peg 40c on the lever 40 is pushed downwards out of the recess 43 which is associated with it. In this position, if the user releases the control bar 16, the actuating element 18 returns automatically to its locking position under drive from the spring 23. However, the user can also move the seat 1 along the longitudinal axis so that the peg 40c comes to be positioned under one of the uninterrupted portions 42 of the horizontal flange 41b of the plate 41. Thus, when the user releases the control bar 16, the peg 40c on the lever 40 comes into abutting contact against one of the uninterrupted portions 42 of the plate 41 so that the actuating element 18 is held in its unlocking position.

This embodiment makes it possible, particularly quickly, to adapt a conventional runner to form a runner enabling the moving rail 7 to be adjusted relative to the fixed rail 6 in a very small number of predetermined longitudinal positions. In this embodiment, it is necessary merely for the plate 41 to be mounted on the web of each fixed rail 6 while also mounting the lever 40 on the actuating element 18 merely by fixing with a nut.

Figure 6:
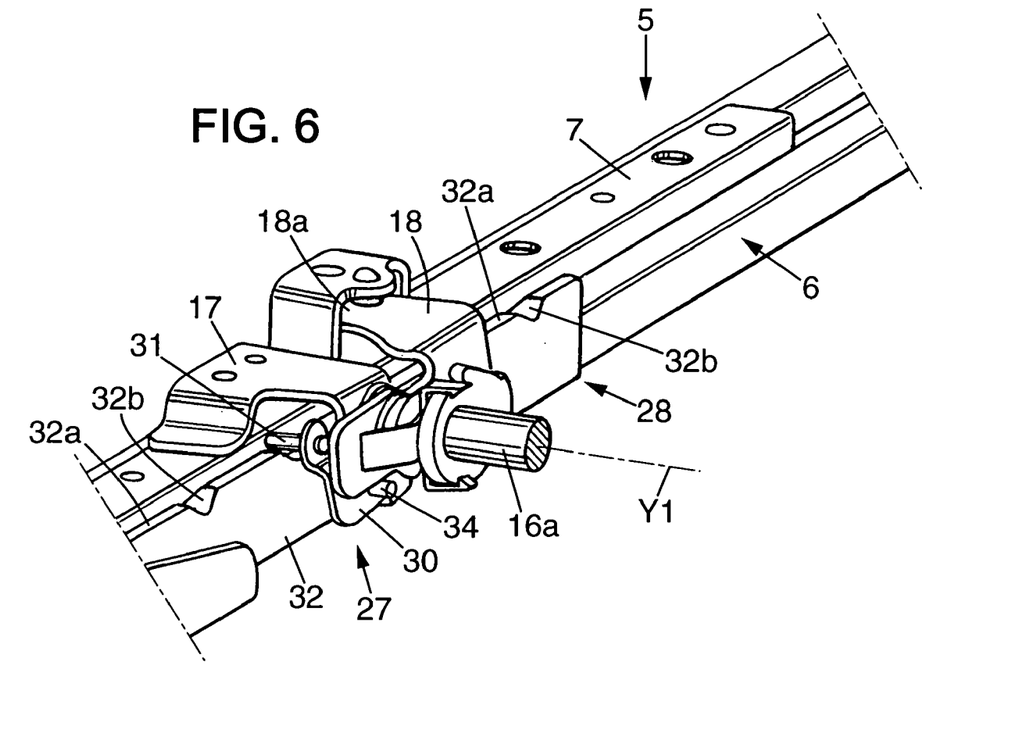
FIG. 6 is a perspective view from above of a third embodiment of the runner.

In a third embodiment of the invention shown in FIGS. 6 and 7, the retaining means 27 are formed by a lever 30 mounted to pivot on the arm 17 and about the first transverse axis Y1, said lever 30 being provided firstly with a peg 31 serving to co-operate with the longitudinal indexing means 28 on the fixed rail 6, and secondly with a projecting member (see FIG. 7) serving to cooperate with the actuating element 18 as described below.

The longitudinal indexing means 28 are formed in this example by a substantially channel-section plate 32 clipped directly onto a vertical flange of the fixed rail 6. Said plate 32 comprises a vertical web from which two side flanges extend that come to clip onto the web 8 and the flange extension 11 of the corresponding fixed rail 6. Where its vertical web meets its top side flange, said plate 32 has a plurality of unlocking segments 32a defined by recesses 32b, thereby forming a guide ramp for the peg 31 on the lever 30.

Said recesses 32 in the guide ramp are substantially triangular in shape, each recess having two slopes that diverge going towards the unlocking segments 32a. The lever 30 is mounted to be free to pivot about the first transverse axis Y1, while the actuating element 18 is constrained to pivot with the side branches 16a of the control bar 16.

Figure 7:
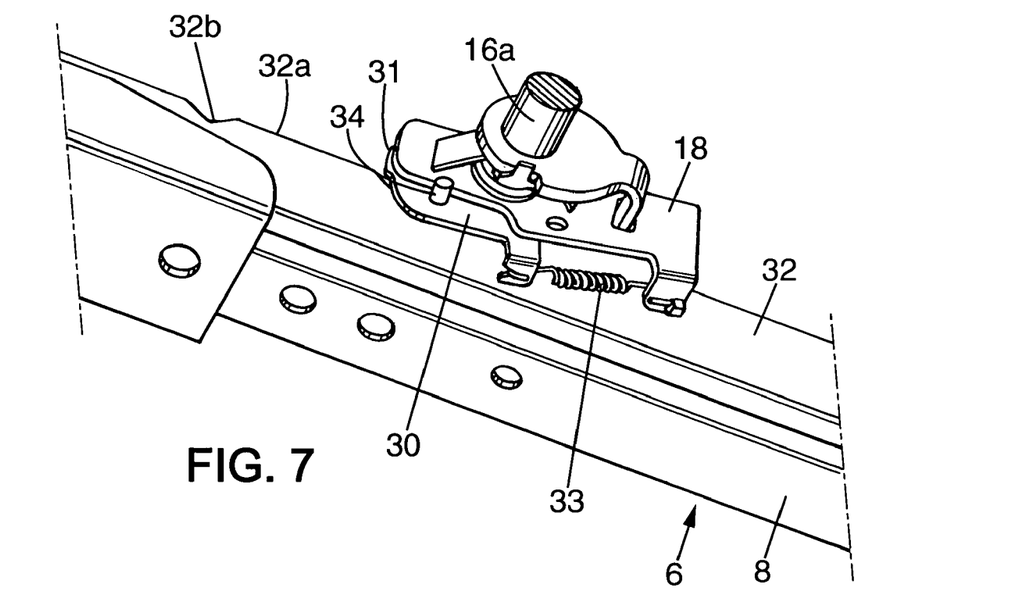
FIG. 7 is a perspective view from below of the third embodiment of the runner of the invention.

As can be seen in FIG. 7, the lever 30 and the actuating element 18 are interconnected by a traction spring 33 adapted to avoid any dimension dispersion between the peg 31 of the lever 30 and the control finger 18a of the actuating element 18. The traction force exerted by the spring 33 on the actuating element 18 is lower than the force exerted by the spring 23 which tends to return the latch 19 to its locked position.

When the runner 5 is in its locked state, as shown in FIG. 5, the peg 31 on the lever 30 is received in one of the recesses 32b in the plate 32, while the spring 23 holds the latch 19 in its locked position.

When a user actuates the middle branch of the control bar 16 by pulling it upwards, said user moves the actuating element 18 into its unlocking position, thereby causing the latch 19 to be brought into its locked position against the force from the spring 23. During this first stage, only the actuating element 18 pivots about the first transverse axis Yl, thereby causing the spring 33 to relax without causing the lever 30 to pivot about the first transverse axis Y1, thereby causing the peg 31 on the lever 30 to remain in its recess 32b. In this configuration, the user releasing the control bar 16 immediately causes the latch 19 to be relocked under the drive from the spring 23. However, when the user keeps pulling the control bar 16 upwards and when said user moves the seat 1, the peg 31 on the lever 30 is guided over one of the two slopes in the triangular recess 32b against the force exerted by the traction spring 33. This causes the lever 30 to pivot about the first transverse axis Y1 until its peg 31 comes into abutting contact with one of the unlocking segments 32a, thereby preventing the lever 30 from pivoting backwards to any extent, while its peg 31 remains in abutting contact against the unlocking segment 32a of the plate 32. At the same time, the projecting member 34 on the lever 30 comes into abutting contact against the actuating element 18 in a manner such as to hold it in its unlocking position and thereby preventing it from moving to any extent towards its locking position by pivoting about the first transverse axis Y1.

The user can then move the seat freely along the longitudinal axis until the peg 31 on the lever 30 comes to be received again in a triangular recess 32b, thereby causing the lever 30 to pivot about the first transverse axis Y1 and thereby enabling the spring 23 to return the latch 19 to the locked position, while causing the actuating element 18 to pivot into its locking position.

In a variant of the third embodiment, it is possible to make provision for the guide ramp formed by the unlocking segments 32a and the recesses 32b to be formed directly where the vertical flanges 10 meet the flange extensions 11 of the fixed rail 6.

In yet another variant of the third embodiment of the invention, it is possible to make provision for the peg 31 to be formed directly and integrally with the actuating element 18. In which case, the peg 31 is situated on a portion of the actuating element 18 diametrically opposite from the control finger 18a about the first transverse axis Y1.

A fourth embodiment of the invention is shown in FIGS. 8a to 8i. In this fourth embodiment, the longitudinal indexing means 28 on the fixed rail 6 are formed by projecting members 35 disposed in fixed manner on a vertical flange 10 of the fixed rail 6. Each projecting member 35 has a substantially triangular shape with first and second slopes 35a, 35b that converge towards a top vertex 35c.

The retaining means 27 for retaining the actuating element 18 comprise a lever 36 which is mounted to pivot on said actuating element 18 about a second transverse axis Y2 that is parallel to the first transverse axis Y1. Said lever 36 is disposed between the actuating element 18 and the vertical wall 10 of the fixed rail 6 which is provided with projecting members 35. Said lever 36 is also provided with a peg 36a serving to co-operate with the projecting members 35 as described below, and a cam surface 36b serving to come into abutting contact against an abutment plate 37 when the peg 36a does not co-operate with the projecting members 35. Said abutment plate 37 extends substantially horizontally and it is secured to the arm 17 fixed to the moving rail 7 on which the actuating element 18 is mounted to pivot.

The retaining means 27 of the actuating element 18 also comprise a traction spring 38 which connects the actuating element 18 to the lever 36.

Figure 8A:
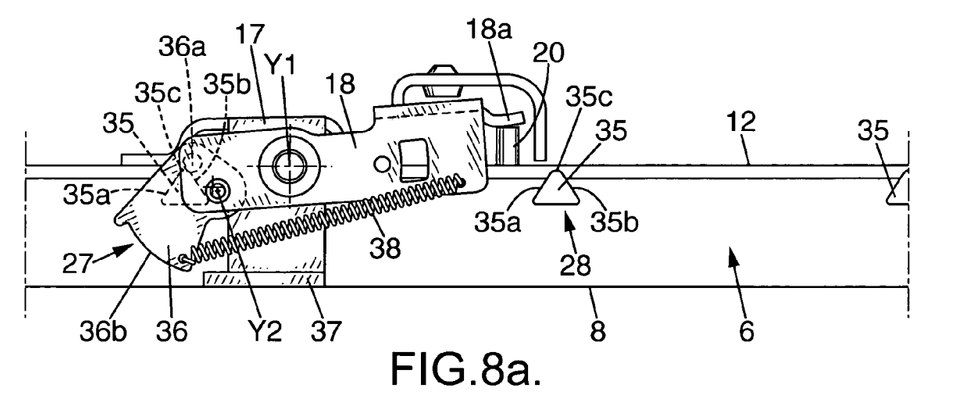
FIGS. 8a to 8i are views of a fourth embodiment of the runner, showing the moving parts of the retaining means for retaining the actuating element, and of the indexing means on the fixed runner of the invention.

FIG. 8a shows the runner in the locked state, in which the actuating element 18 is in its locking position so that the peg 36a of the lever 36 is in abutting contact against the top end of the second slope 35b of the corresponding projecting member 35.

Figure 8B:
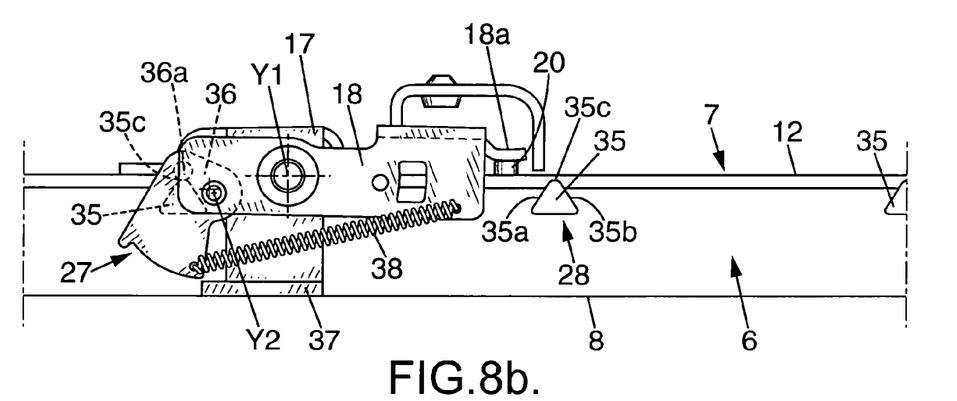
Figure 8C:
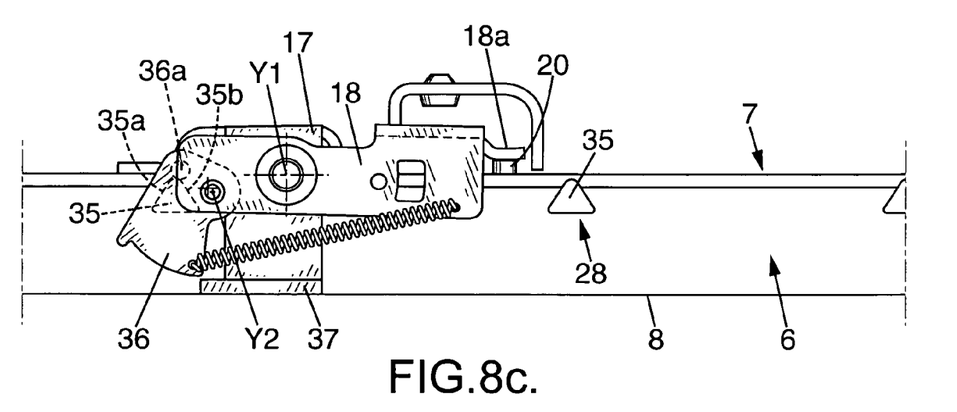

When the user actuates the middle branch of the control bar 16 by pulling it upwards, said user causes the actuating element 18 to pivot into its unlocking position (FIG. 8b) in which the control finger 18a brings the latch 19 into its unlocked position while the peg 36a on the lever 36 comes to be positioned on the top vertex 35c of the projecting member 35. The peg 36a on the lever 36 being put into contact against the vertex 35c of the projecting member 35 results from the lever 36 pivoting about the second transverse axis Y2 under the drive from the traction spring 38. In this configuration as shown in FIG. 8b, the user must continue to pull the middle branch of the control bar 16 upwards in order to keep the actuating element 18 in its unlocking position. In this configuration, the force exerted by the spring 23 to urge the latch 19 into its locked position is greater than the force exerted by the traction spring 38. Thus, when the peg 36a of the lever 36 is in abutment against the top vertex 35c of the projecting member 35, the retaining means 27 are in an unstable position, thereby causing the actuating element 18 to be returned automatically to the unlocking position, as shown in FIG. 8a, under the drive from the forces exerted by the spring 23 forming the resilient drive means for resiliently driving the latch 19.

When the user keeps the actuating element in the unlocking position, and when said user moves the seat significantly (e.g. through a value of about 2 millimeters (mm)), the latch 19 or more exactly its teeth 19a are positioned under the bottom ends of the catches 26. The user can then release the control bar, thereby, under the drive from the spring 23, bringing the teeth 19a on the latch into abutting contact against the bottom ends of the catches 26 (see FIG. 3) on the fixed rail 6 so that the spring 23 cannot return the latch 19 to its locked position. This configuration corresponds to the configuration shown in FIG. 8c in which the peg 36a of the lever 36 nevertheless tends to come into abutting contact against the top end of the second slope 35b of the projecting member 35. In this configuration, the actuating element 18 remains held in its unlocking position by means of the teeth 19a on the catch 19 being put into abutment against the bottom ends of the catches 26 on the fixed rail 6.

Figure 8D:
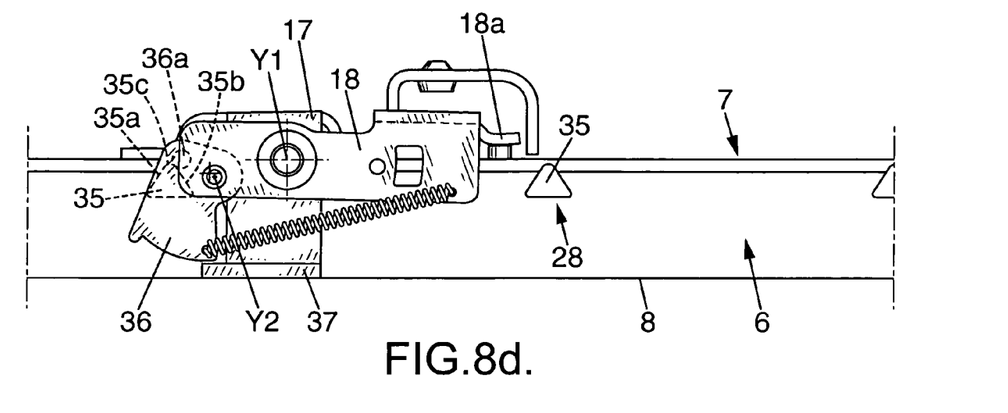

As shown in FIG. 8d, when the user continues to move the seat along the longitudinal axis (e.g. through a value of 4 mm relative to the configuration shown in FIG. 8b), the teeth 19a on the latch 19 are still in abutting contact against the catches 26 on the fixed rail 6, under the drive from the spring 23, while the peg 36a on the lever 36 continues to slide against the second slope 35b of the projecting member 35, thereby enabling said lever 36 to pivot about the second transverse axis Y2 under the drive from the traction spring 38.

Figure 8E:
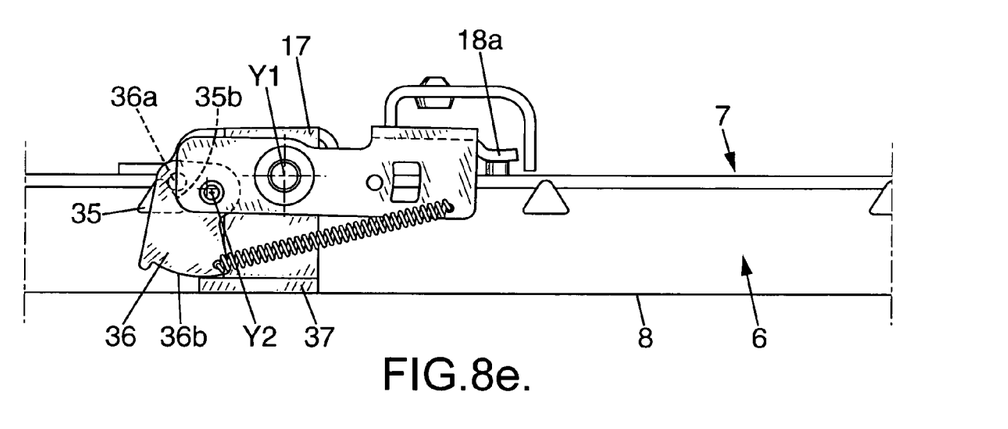

As shown in FIG. 8e, when the user moves the seat further along the longitudinal axis (e.g. through a value of 6 mm relative to the configuration shown in FIG. 8b), a portion, albeit a negligible portion, of the teeth 19a on the latch remains in abutting contact against the catches 26 on the fixed rail 6, while the peg 36a of the lever 36 continues to slide against the second slope 35b of the projecting member 35 so that said lever 36 continues to pivot about the second transverse axis Y2 until its cam surface 36b comes flush with the abutment plate 37 that is secured to the arm 17.

Figure 8F:
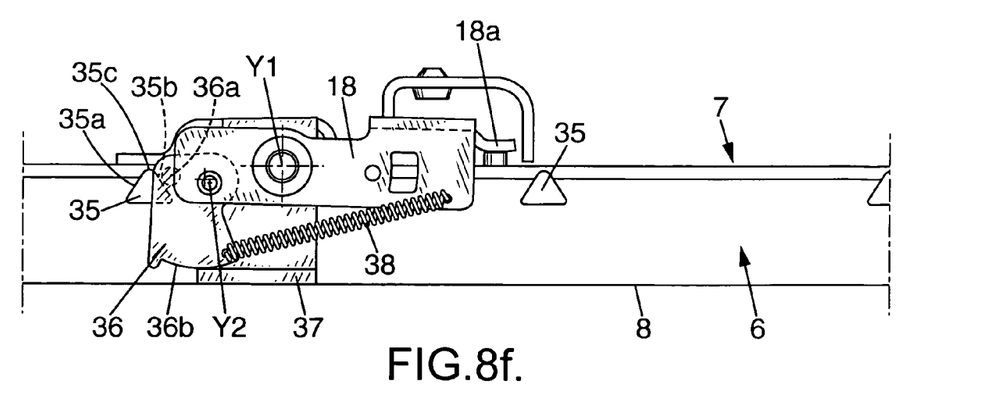

When the user continues to move the seat even further along the longitudinal axis as shown in FIG. 8f (e.g. through a value of 8 mm relative to the configuration shown in FIG. 8b), the teeth 19a on the latch 19 then find themselves in register with the notches 26a defined by the catches 26 on the fixed rail 6, so that the latch 19 could then be returned to its locked position under the drive from the spring 23. However, during this movement, the peg 36a on the lever 36 is no longer in contact against the second slope 35b of the projecting member 35 so that the lever 36 pivots about the second transverse axis Y2 under the drive from the traction spring 38. The lever 36 pivoting in this way causes its cam surface 36b to be brought into direct contact with the abutment plate 37 that is secured to the arm 17, thereby holding the actuating element 18 in its unlocking position against the force exerted by the spring 23.

In this configuration as shown in FIG. 8f, the actuating element 18 is held in its unlocking position against the force exerted by the spring 23 by the cam surface 36b of the lever 36 being put into abutting contact against the abutment plate 37 that is secured to the arm 17. The user can then move the moving rail 7 until the retaining means 27 for retaining the actuating element 18 co-operate again with a projecting member 35 of the fixed rail 6.

Figure 8G:
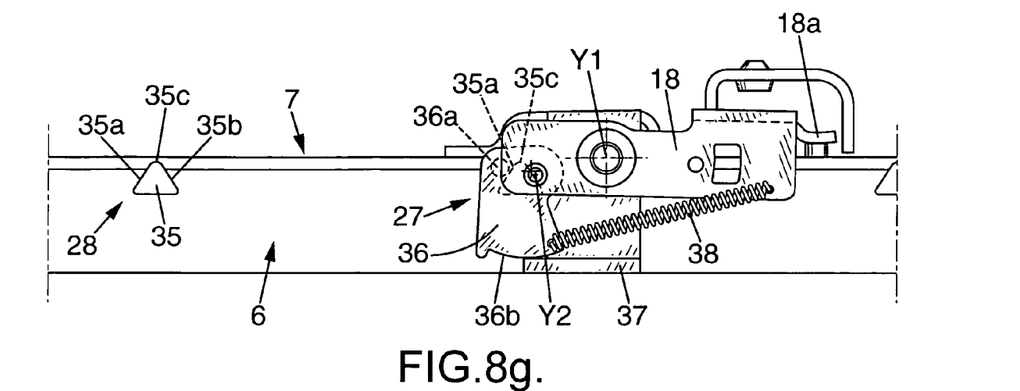
Figure 8H:
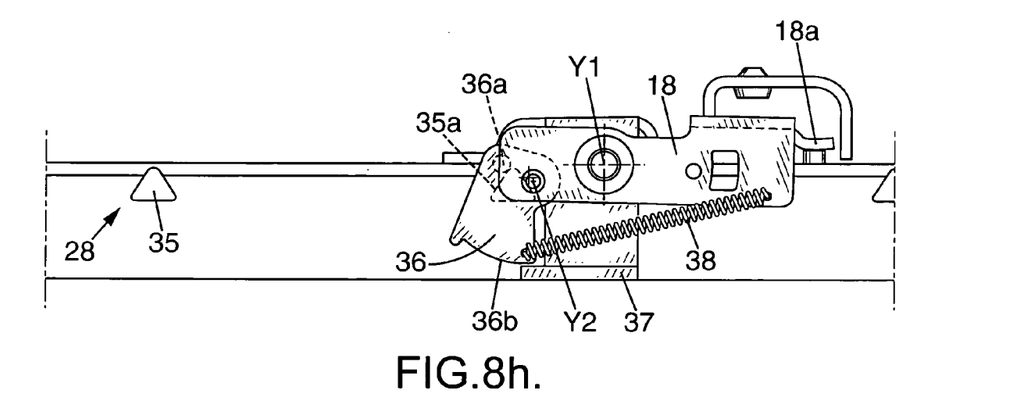

FIG. 8g shows a configuration in which the retaining means 27, comprising in particular the lever 36 and the abutment plate 37, hold the actuating element 18 in its unlocking position just before the peg 36a of the lever 36 cooperates again with the next projecting member 35. In this configuration as shown in FIG. 8g, the teeth 19a on the latch are once again in register with the bottom ends of the catches 26 even though the cam surface 36b of the lever is still in direct contact with the abutment plate 37 so as to hold the actuating element 18 in its unlocking position.

When the peg 36a comes into abutting contact with the first slope 35a of the corresponding projecting member 35 (FIG. 8h), the lever 36 then pivots automatically about the second transverse axis Y2, so that the cam surface 36b of the lever 36 is no longer in abutting contact with the abutment plate 37 on the arm 17. In this configuration, the actuating element 18 remains held in its unlocking position by means of the teeth 19a on the latch 19 being put into abutment against the bottom ends of the catches 26 on the fixed rail 6.

Figure 8I:
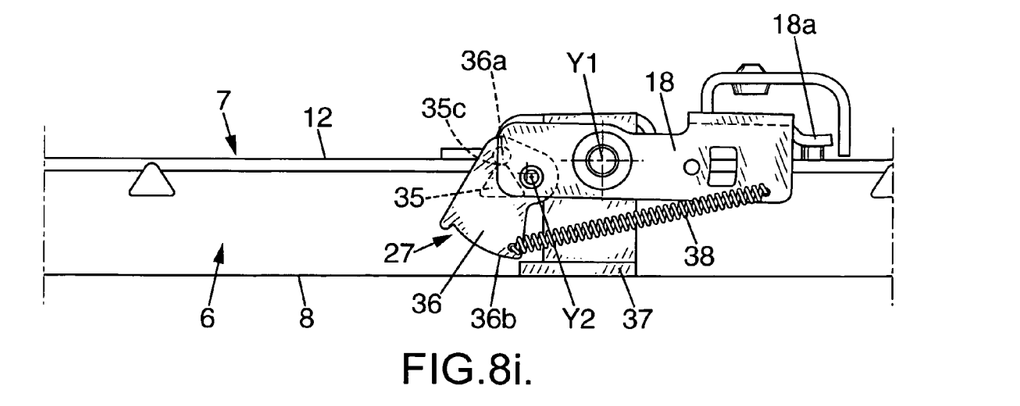

When the user continues to move the seat along the longitudinal axis as shown in FIG. 8i, the peg 36a on the lever 36 comes into contact against the top vertex 35c of the projecting member 35. The runner 5 then finds itself in the same configuration as in FIG. 8b. The retaining means 27 are then in an unstable position, which causes the actuating element 18 to be returned to the locking position as shown in FIG. 8a under the drive from the forces exerted by the spring 23 which forms the resilient drive means for resiliently driving the latch 19.

In a fifth embodiment shown in FIGS. 9a and 9b, the retaining means 27 are formed by a lever 44 mounted to pivot on the arm 17 about a second transverse axis Y2, said lever 44 being provided firstly with a peg 45 serving to co-operate with the longitudinal indexing means 28 on the fixed rail 6, and secondly with a projecting member 46 extending towards the actuating element 18 and that serves to retain said actuating element 18 as described below.

The longitudinal indexing means 28 are formed in this example by a groove or a slot 47 formed directly on a vertical flange 10 of the fixed rail 6. The peg 45 on the lever 44 is designed to be received in said groove 47 in the fixed rail 6. More precisely, said groove 47 is made up of a plurality of unlocking segments 47a which extend substantially longitudinally and which are defined by curved portions 47b (FIG. 9b) that extend downwards and that act as a recess for receiving the peg 45 on the retaining lever 46 for retaining the actuating element 18. Each of the curved portions 47b has a top portion 48 that is substantially convex and a bottom portion 49 that is substantially concave.

Figure 9A:
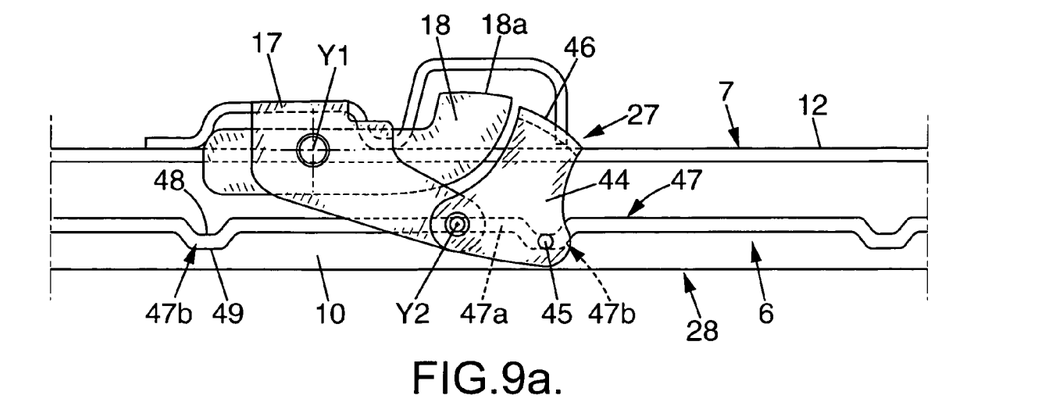
FIGS. 9a and 9b are side views of a fifth embodiment of the runner, showing the actuating element respectively in the locking position and in the unlocking position.
Figure 9B:
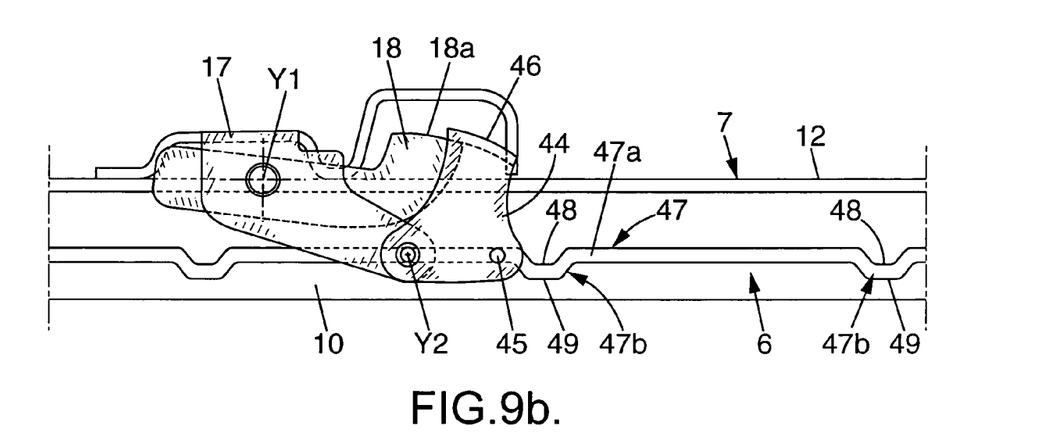

FIG. 9a shows the runner when the moving rail 7 is held relative to the fixed rail 6, i.e. when the actuating element 18 is in its locking position. In this configuration, the peg 45 on the lever 44 is disposed in a recess 47b in the indexing means.

When the user actuates the control bar 16 to cause the actuating element 18 to pivot towards its unlocking position which corresponds to the latch 19 being in the unlocked position, the peg 45 on the lever 44 remains in the recess 47b which is associated with it in the indexing means 28. The user can then move the seat forwards or backwards along the longitudinal axis L so that the peg 45 on the retaining lever 44 comes into abutting contact against one of the two slopes of the concave bottom portion 49 of the curved recess 47b. The peg 45 being put into contact with one of the slopes of the concave portion 49 of the recess 47b in this way then causes the lever 44 to pivot about the second transverse axis Y2 so that its projecting member 46 comes to be positioned above the control finger 18a on the actuating element 18. The user can then release the control bar 16, thereby causing the peg 45 to be put into contact against the top wall of the corresponding unlocking segment 47a so that the projecting member 46 on the lever 44 holds the actuating element 18 in its unlocking position against the forces exerted by the spring 23. Since the latch 19 is then held in its unlocked position, the user can then continue to move the seat along the longitudinal axis until the peg 45 on the lever 44 comes into abutting contact against the convex top portion 48 of the recess 47b so as to cause the lever 44 and its projecting member 46 to pivot about the second transverse axis Y2 so as to release the actuating element 18, thereby enabling the spring 23 to return the latch 19 to its locked position, thereby also causing the actuating element 18 to be moved into its locking position.

What is claimed is:

1. A runner for a motor vehicle seat, said runner comprising:
    a fixed rail and a moving rail mounted to move relative to the fixed rail along a longitudinal axis;
    a latch received between the fixed rail and the moving rail and which is mounted to move between a locked position in which said latch holds the moving rail stationary, and an unlocked position in which said latch enables the moving rail to move, and resilient drive means for resiliently driving the latch towards the locked position;
    an actuating element mounted to move relative to the moving rail between an unlocking position in which said actuating element brings the latch into the unlocked position and an unlocking position in which said latch can be moved towards the unlocked position under the drive from the resilient drive means;
    wherein retaining means for retaining the actuating element are adapted to co-operate with longitudinal indexing means on the fixed rail so as firstly to hold the actuating element in the unlocking position over at least one predetermined range of longitudinal positions, and secondly to allow said actuating element to move into the locking position outside said at least one predetermined range of longitudinal positions.

2. A runner according to claim 1, in which the actuating element is mounted directly to pivot on an arm about a first transverse axis that is perpendicular to the longitudinal axis, said arm being mounted in fixed manner on the moving rail.

3. A runner according to claim 2, in which the retaining means for retaining the actuating element comprise a peg and the longitudinal indexing means on the fixed rail comprise a longitudinal guide ramp which has firstly at least one unlocking segment forming the predetermined range within which the peg is in abutting contact against the unlocking segment for holding the actuating element in the unlocking position, and secondly at least two recesses disposed on either side of the unlocking segment and which are designed to receive the peg on the retaining means of the actuating element so as to allow said actuating element to move towards the locking position after the latch has moved towards the locked position under the drive from the resilient drive means.

4. A runner according to claim 3, in which the peg is formed integrally with the actuating element, and the longitudinal guide ramp is in the form of a substantially horizontal rigid plate that is mounted in fixed manner on the fixed rail.

5. A runner according to claim 3, in which the retaining means comprise a lever mounted to pivot on the arm of the moving rail, the lever having said peg and a projecting member serving to hold the actuating element in the unlocking position when the peg of the lever is in abutting contact with the unlocking segment of the guide ramp.

6. A runner according to claim 5, in which the unlocking segment and the two recesses are provided in a substantially vertical plate mounted in fixed manner on a side wall of the fixed rail, and the lever is mounted to pivot about the first transverse axis.

7. A runner according to claim 5, in which the unlocking segment and the two recesses are formed by a substantially longitudinal groove provided in a side flange of the fixed rail, said peg being received in the groove and the lever being mounted to pivot on the arm about a second transverse axis parallel to the first transverse axis.

8. A runner according to claim 3, in which the peg is disposed on a lever mounted on the actuating element so that said lever is constrained to move with the actuating element and the longitudinal guide ramp is in the form of a rigid plate mounted in fixed manner on the fixed rail.

9. A runner according to claim 2, in which:
    the retaining means for retaining the actuating element comprise a lever which is mounted to pivot on said actuating element about a second transverse axis that is parallel to the first transverse axis, said lever having a peg and a cam surface serving to come into abutting contact, when the peg does not co-operate with the indexing means, against a substantially horizontal abutment plate which is secured to the arm of the moving rail under the drive from a traction spring which connects said lever to the actuating element so as to hold the actuating element in the unlocking position; and
    the longitudinal indexing means on the fixed rail are formed by projecting members disposed in fixed manner on a side wall of the fixed rail, each projecting member having a substantially triangular shape with two slopes which converge towards a top vertex, said peg of the lever serving to come into contact against one of the slopes of one of the projecting members while the moving rail is moving, so as to enable the lever to pivot and so as to enable the cam surface to be disengaged from the abutment plate, thereby enabling the actuating element to move towards the locking position under the drive from the resilient drive means which drive the latch towards the locked position.

* * * * *